April 5, 1960

J. R. JAMIESON 2,931,617

DAMPED SOLENOID VALVE OPERATOR

Filed May 11, 1955

INVENTOR.
JOHN R. JAMIESON
BY Joseph E. Ryan
ATTORNEY

# United States Patent Office 2,931,617
Patented Apr. 5, 1960

2,931,617

DAMPED SOLENOID VALVE OPERATOR

John R. Jamieson, Minneapolis, Minn., assignor to Minnesota-Honeywell Regulator Company, Minneapolis, Minn., a corporation of Delaware Application May 11, 1955, Serial No. 507,552

2 Claims. (Cl. 251—54)

The device disclosed is a solenoid valve operator and more specifically is an improved solenoid operator which is fluid damped to eliminate the objectionable hammer sound commonly found in solenoid operated valves.

The main object of this improved device is to provide a fluid damped solenoid operator that is quiet in operation.

A further object of this invention is to provide an improved device that has a fluid damped solenoid having improved heat dissipation characteristics.

Still another object of this invention is to provide a quiet operated solenoid type valve in which the usual hammer action of the plunger striking its stop is substantially eliminated.

These and other objects will become apparent from reading the following specification when considered with the attached drawings.

Figure 2:
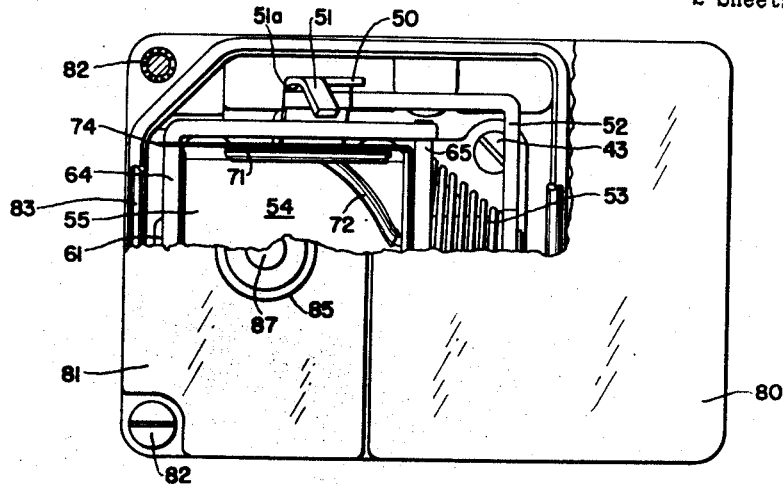
Figure 2 is a top view of the device shown in Figure 1 and is in partial cross-section.
Figure 1:
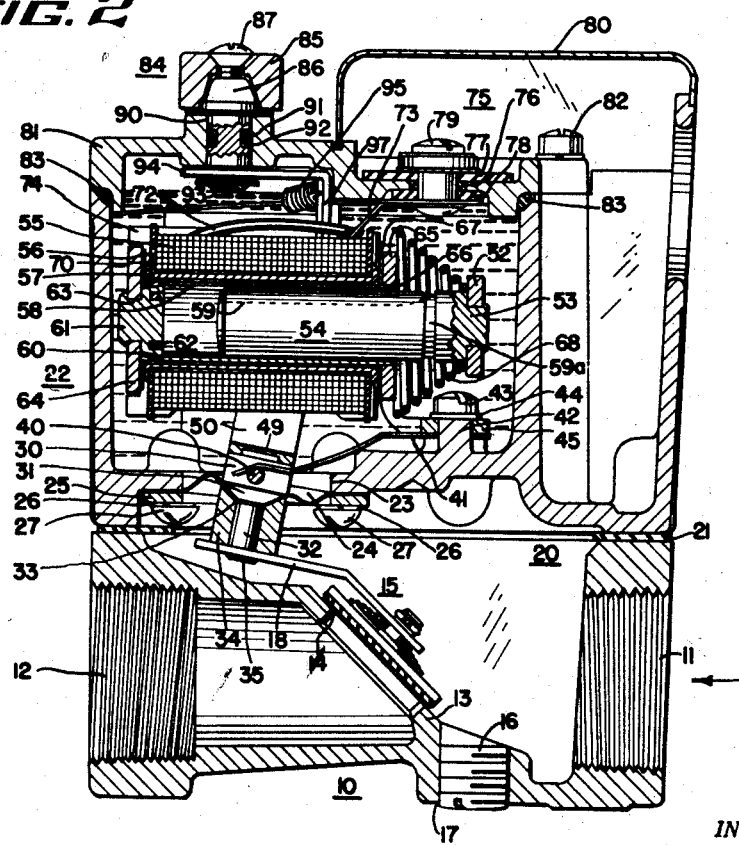
Figure 1 is a cross-section of a valve and solenoid embodying one version of this novel device.

Referring to Figures 1 and 2 there is disclosed a valve generally shown at 10 having an inlet 11 and an outlet 12. A partition 13 separates the inlet 11 and outlet 12 and forms a valve seat 14 for the valve generally shown at 15. The valve body 10 also contains a plug 16 which seals an opening 17. The valve body 10 further has an open side generally indicated at 20 and this side is encircled by a gasket 21. A solenoid enclosure generally shown at 22 engages the gasket 21 and acts as the closure of the valve body opening 20. The valve body 10, gasket 21 and solenoid enclosure 22 are held in fluid tight engagement by means such as screws (not shown).

The solenoid enclosure 22 is formed with a chamber therein and has a bottom opening 23 adjacent the opening 20. The opening 23 is then sealed by a flexible diaphragm 24 which is held in place by a washer-like member 25. The washer-like member 25 is further held tightly against the solenoid closure 22 by washers 26 and screw 27. The arrangement of the flexible diaphragm 24, the washer-like member 25, washers 26, and screws 27 provide a fluid tight but completely flexible partition separating the openings 20 and 23. A rivet-like member 30 having a tapered section 31 and a pin 32 penetrates the flexible diaphragm 24 at 33. A sleeve member 34 fits over the pin portion 32 of the member 30 and has a taper which mates with the tapered portion 31. The sleeve 34, when in place, tightly presses the diaphragm 24 to the tapered section 31 and seals the hole 33 in a fluid tight joint. The sleeve 34 is held in place by passing through a valve operator 18, which forms part of the valve 15. The pin 32 is riveted or crimped at 35 to hold the valve operator 18 tightly against the sleeve 34. With this arrangement the valve 15 can easily be operated by means of valve operator 18 by movement of the member 30 in conjunction with the flexible diaphragm 24.

The member 30 is provided with a pivot pin 40 which rests on two bearing surfaces (not shown) to allow the member 30 to be pivoted and thereby operate the valve 15 through the valve operator 18 and pin 32. The pivot pin 40 is held in place by a leaf spring 41 which is held in engagement with the solenoid enclosure 22 at ridge 42. The spring 41 is held in place on the ridge 42 by a bolt 43 and washer 44. Bolt 43 and washer 44 also hold a solenoid mounting bracket 45.

Figure 3:
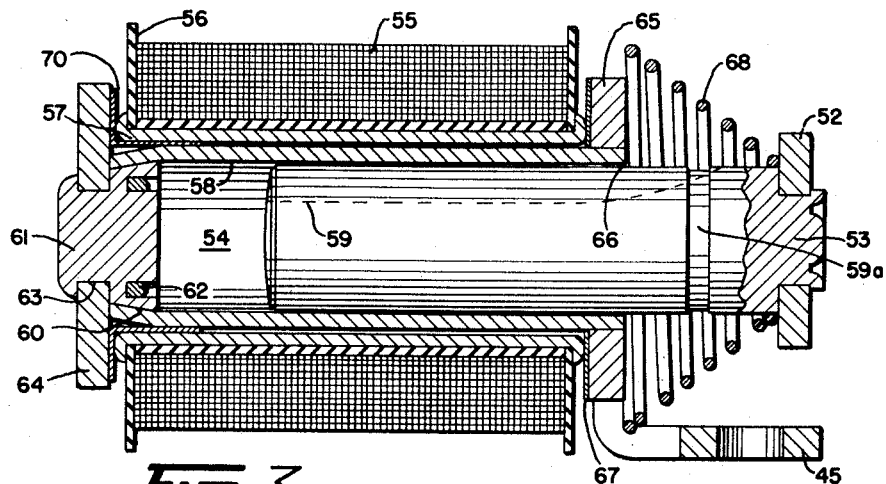
Figure 3 is a cross-section of the solenoid section of Figures 1 and 2.

The member 30 is attached to a yoke 50 by means such as riveting or crimping at 49. The yoke 50, as seen in Figure 2, has projecting from it an arm 51, the purpose of which will be explained below. The yoke 50 is pivotally connected to another yoke 52 at 51a by means hidden under arm 51. The yoke 52 is further attached, as by riveting or other convenient means, to a solenoid plunger 53, which forms part of the solenoid and operator arrangement generally shown at 54. The solenoid operator generally shown at 54 is further made up of a winding 55 wound in a conventional nature on a bobbin 56 of an insulating material. A sleeve 57 is placed within the bobbin 56 to add rigidity to the solenoid operator 54. Inside of sleeve 57 is placed a solenoid plunger sleeve 58 which is slidably engaged with the solenoid plunger 53. A slot 59 is provided in plunger 53. As seen in Figures 1 and 3 the slot 59 extends from the inside end of plunger 53 to a point remote from its other end. The purpose of slot 59 will become apparent from a description of the operation of the device, as set out below. Sealing the end 60 of the solenoid plunger sleeve 58 is a magnetic stop 61. Imbedded in the magnetic stop 61 is a shading ring 62. The magnetic plunger stop 61 is held in place in the end of the nonmagnetic plunger tube 60 by crimping, soldering, or any convenient manner. The plunger stop 61 also passes through a hole 63 in a magnetic yoke 64 (best seen in Figure 2). The yoke 64 encircles three sides of the solenoid winding 55 and is further attached to a magnetic member 65. The magnetic member 65 completes the magnetic circuit around the solenoid 54 and contains a hole 66 which allows the substantially nonmagnetic plunger tube 58 to pass therethrough. This in turn allows the solenoid plunger 53 to pass through the opening 66 and into the center of the solenoid 54. The member 65 is rigidly attached to the solenoid supporting member 45, or these two members could be formed of a single piece of magnetic material. A spacing member 67 is provided between the sleeve 57 and member 65 to allow for any strains set up in the assembly of the solenoid operator 54. A spring 68 is placed between member 65 and yoke 52 to bias the plunger 53 to the position shown. There is also supplied a magnetic flange and sleeve 70 encircling the end 60 of the solenoid plunger tube 58. The function of this magnetic flange and sleeve 70 will be explained in detail below. The leads 71 and 72 connect to appropriate terminals, one of which is shown at 73. The leads 71 and 72 are insulated from the magnetic yoke 64 by an insulating member 74. The electrical connection from terminal 73 to the exterior of the solenoid enclosure 22 is accomplished by terminal bolt generally at 75. The terminal bolt 79 clamps insulating members 76, 77, and 78 together to form both a fluid tight joint and a completely insulated connection for terminal 73. A similar arrangement is utilized (but not shown) to bring lead wire 71 out of the solenoid enclosure 22. The terminals for the solenoid operator 54 are protected by a cover 80 which is held on the solenoid enclosure by a convenient means.

The solenoid enclosure 22 is further supplied with a cover member 81 which is held in place by screws 82. The closure member 81 is provided with a fluid tight O-ring seal 83. The closure member 81 further has a manual opening device passing through it and generally shown at 84. The manual closing device consists of a knob 85 attached to a shaft 86 by a screw member 87. The shaft 86 passes through an opening 90 in the cover member 81. To provide a fluid tight seal between the closure member 22 and the manual operator 84 a flexible O-ring 91 is placed about an indentation 92 in the shaft 86. Attached to the lower end 93 of the shaft 86 is a lever arm 94. The connection between the lever 94 and the end 93 of shaft 86 may be of any convenient, nonslip arrangement. The lever 94 is biased by spring 95 against a stop (not shown) formed in cover member 81. The lever 94 has a projecting arm 97 which engages the arm 51 of the yoke 50. It is therefore possible by rotating knob 85 to rotate shaft 86, operator 94, arm 97, and arm 51 to operate the yoke 50 to manually open the valve 15. Frictional means (not shown) provide for locking the manual operator after it has been rotated to open the valve 15. It should be understood that this valve device could be built up with a cover unit similar to that of 81 but containing no manual opener. After the assembly of the unit, but before cover 81 is placed on the solenoid enclosure 22, the solenoid enclosure is filled with a fluid such as oil. The purpose of the oil fill will be described below.

In describing the operation of this novel solenoid operator reference will be made to Figure 3, which is an enlarged detailed showing of the solenoid operator only. The numbering contained in Figure 3 corresponds to that of Figures 1 and 2. It should be remembered that the unit shown in Figure 3 is surrounded by a fluid such as oil. The oil fill surrounding the plunger 53 is allowed to flow through the slot 59 and completely fill the space between the plunger 53 and the end stop 61. As described above, when the device is de-energized, the spring 68 biases the plunger 53 and yoke 52 in an outward direction. The extent of the travel of the yoke 52 is limited by the mechanical linkages between it and the valve 15. Upon supplying an alternating current energization to the solenoid coil 55, a magnetic field is established in the solenoid. A complete magnetic circuit is established around the coil by the yoke 64, member 65, and through the core center by the plunger 53 and stop 61. The plunger immediately attempts to be pulled into the solenoid plunger tube 58 overcoming the bias of spring 68. As the plunger 53 moves into the plunger tube 58 the oil therein trapped, is forced to move out through slot 59. The slot 59 is made large enough so that the movement of the plunger at the outset, is not impeded. As the plunger 53 continues to move inward the slot 59 is disconnected from the surrounding oil by passing through the hole 66. At this time the flow of oil outward through the slot 59 is cutoff and the plunger 53 is rapidly slowed before striking stop 61. Since the fit of the plunger 53 in the solenoid tube 58 is not perfectly tight the small remaining amount of oil trapped between the end of plunger 53 and plunger stop 61 slowly is expelled around the edges of plunger 53. This operation is made uniform by the use of slot 59a which allows the leakage of the fluid fill to be constant regardless of the orientation of plunger 53. This arrangement allows the plunger 53 to move rapidly at the outset and then damps the movement so that the plunger 53 does not strike the plunger stop 61 with enough force to create a hammer sound. It is understood that any form of passageway through the plunger, which is vented in a manner so as to be properly cutoff during the plunger movement, could be used. The elimination of the hammer sound is further aided by the magnetic flange and sleeve 70. As the plunger 53 moves into the solenoid plunger tube 58 the end of the solenoid plunger 53 comes into alignment with the flange and sleeve 70. At this point some of the flux passing through the plunger 53 is shunted away from the magnetic stop 61 through the flange and sleeve 70. This shunting is increased as the plunger proceeds towards the stop 61. The combined effect of the shunted magnetic flux and the oil damping provides a solenoid operator which is exceedingly quiet and which has the further advantage of having a rapid operation at its outset, which is desired for positive opening of the valve. It should be further pointed out that the oil surrounding the solenoid and plunger provides an excellent heat transfer medium. Any heat generated in the coil is immediately transferred to the oil fill and this heat is then transferred to the solenoid closure 22. By this arrangement a valve operator or solenoid operator is provided which can be operated under much more severe conditions than a device that is surrounded by air.

Figure 4:
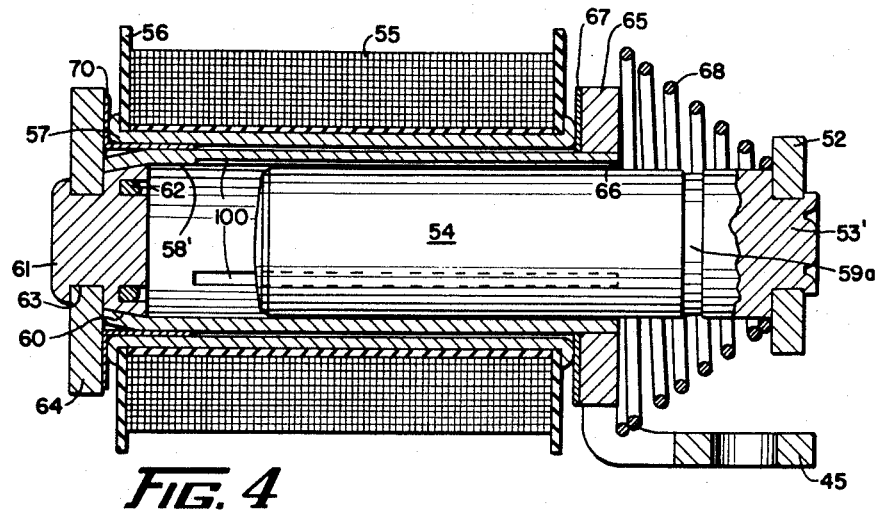
Figure 4 is a cross-section of a solenoid disclosing another embodiment of this device.

A modification of the operator shown in Figure 3 is disclosed in Figure 4. The same numbers will refer to identical parts. As it will be seen the solenoid operator shown in Figure 4 is made up of the identical parts to Figure 3 with the exception of the design of the plunger 53 and the plunger tube 58. In Figure 4 a plunger 53' is supplied which contains no slot. However, the plunger tube 58' contains a plurality of slots 100. With this arrangement the operation of the two devices is identical. The plunger 53' when pulled in eventually seals the slots 100 and causes the flow of oil that would occur to be reduced only to the leakage around the plunger 53. This operation therefore is identical to that of Figure 3.

In both the forms of Figures 3 and 4, it will be apparent that the core and sleeve form the fixed and movable elements, respectively, of a restricting valve means for the oil passage so as to begin to reduce the flow of oil therethrough when the plunger reaches a predetermined position in its approach to the core.

It will be understood that if this device were to be operated on direct current that the shading ring 62 would be unnecessary. In that case the plunger stop 61 would be merely a flat magnetic member and would not contain the shading ring slots shown.

While the preferred embodiment of the invention has been disclosed above, it is understood that other modifications may be made without departing from the spirit of the invention. Therefore, the scope of the invention should be determined by the appended claims and not by the specific disclosure of the preferred embodiment thereof.

I claim as my invention:

1. In a solenoid operator of the class described: an enclosure having a chamber therein including a flexible member sealing one side of said enclosure liquid tight; a liquid substantially filling said chamber; a solenoid including solenoid tube means, energizing means, and a magnetic plunger; said tube means being disposed entirely within said liquid and including an open end and a stop means substantially closing the end remote from said open end; said magnetic plunger extending through the open end of said tube means and sliding therein in response to said energizing means, and said plunger having substantially the same cross-sectional configuration as the interior of said tube means so as to substantially close said open end; connection means connected to said plunger and extending from said plunger through said diaphragm to a device to be operated and effective upon operation of said solenoid to transmit an operating movement through said diaphragm without appreciable change in the volume of said chamber available for said liquid; and passage means connecting the liquid in the chamber to the liquid in said tube means between the plunger and said stop means; said liquid flowing in said passage during the movement of the plunger means in said tube means; said plunger and a portion of said tube means constituting the movable and fixed elements, respectively, of a restricting valve means for said passage means in such a manner that the movement of the plunger toward said stop means at a predetermined position in said tube begins to restrict the flow of liquid through the passage means to quietly damp the plunger to a stop at the stop means of said tube.

2. In a solenoid operator for a valve: an enclosure having a chamber therein including a flexible member sealing one side of said enclosure liquid tight; a liquid substantially filling said chamber; a solenoid completely immersed in said liquid and including solenoid tube means, energizing means, and a magnetic plunger; said tube means including an open end and a stop means substantially closing the end remote from said open end; said magnetic plunger extending through the open end of said tube means and sliding therein in response to said energizing means, and said plunger having substantially the same cross-sectional configuration as the interior of said tube means so as to substantially close said open end; connection means connected to said plunger and extending from said plunger through said diaphragm to a valve to be operated and effective upon operation of said solenoid to transmit an operating movement through said diaphragm without appreciable change in the volume of said chamber available for said liquid; and passage means connecting the liquid in the chamber to the liquid in said tube means between the plunger and said stop means; said liquid flowing in said passage during the movement of the plunger means in said tube means; said plunger and a portion of said tube means constituting the movable and fixed elements, respectively, of a restricting valve means for said passage means in such a manner that the movement of the plunger toward said stop means at a predetermined position in said tube begins to restrict the flow of liquid through the passage means to quietly damp the plunger to a stop at the stop means of said tube.

References Cited in the file of this patent
UNITED STATES PATENTS

| | | |
|---|---|---|
| 923,858 | Kilgore | June 8, 1909 |
| 1,209,646 | Reed | Dec. 19, 1916 |
| 1,226,748 | Burnham | May 22, 1917 |
| 1,503,881 | Bros | Aug. 5, 1924 |
| 1,730,688 | Rippl | Oct. 8, 1929 |
| 2,018,479 | Zeininger | Oct. 22, 1935 |
| 2,145,977 | Foster | Feb. 7, 1939 |
| 2,245,834 | Sparrow | June 17, 1941 |
| 2,344,178 | Sparrow | Mar. 14, 1944 |
| 2,345,276 | McCarty | Mar. 28, 1944 |
| 2,365,727 | Pike | Dec. 26, 1944 |
| 2,622,622 | Ray | Dec. 23, 1952 |
| 2,654,053 | Wallace | Sept. 29, 1953 |
| 2,689,363 | Frye | Sept. 21, 1954 |
| 2,712,429 | Ray | July 5, 1955 |
| 2,757,321 | Wallace | July 31, 1956 |
| 2,792,195 | Mosbacher | May 14, 1957 |